E. F. LOCKWOOD.
MULTIPLE PAN CONSTRUCTION.
APPLICATION FILED AUG. 14, 1914.
1,149,927.
Patented Aug. 10, 1915.
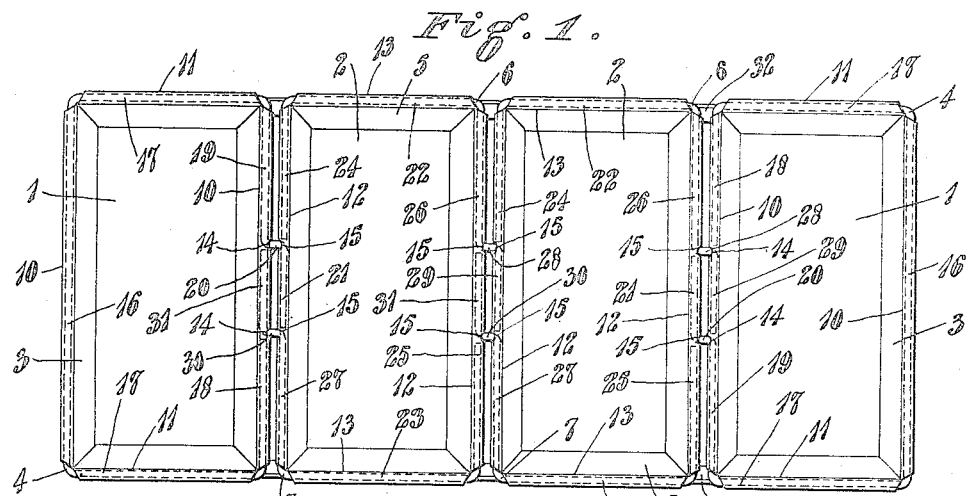
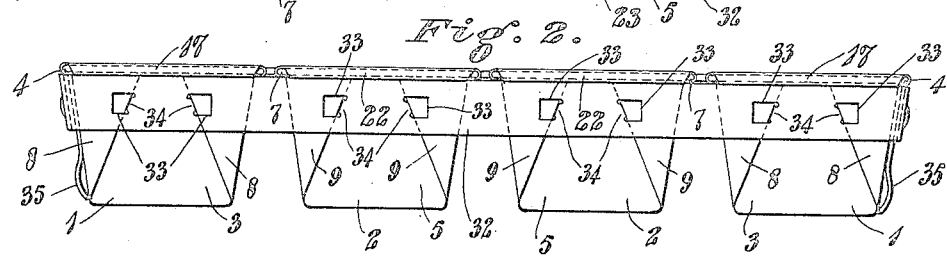
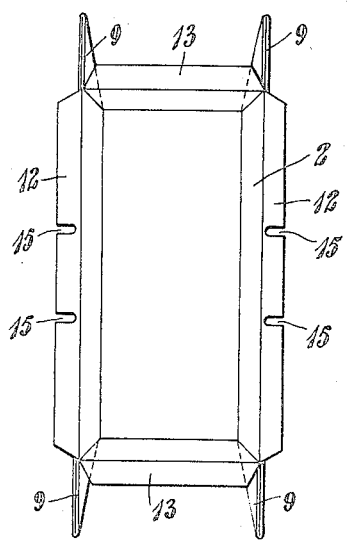
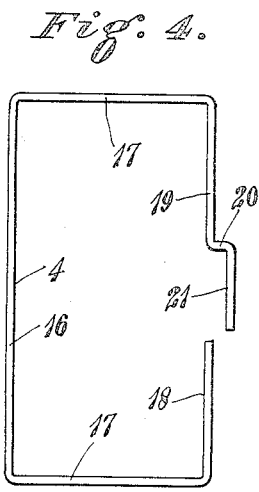
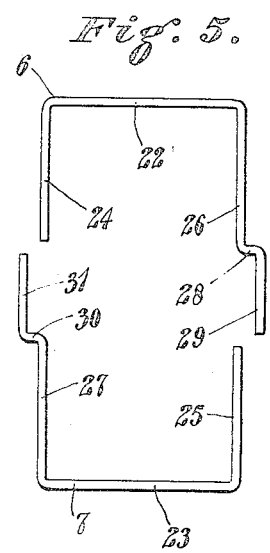
Witnesses:
Clarence Perdew
Arene Parker
Inventor
Edwin F. Lockwood
By Jacob N. Ramsey
Attorney

UNITED STATES PATENT OFFICE.

EDWIN F. LOCKWOOD, OF BELLEVUE, KENTUCKY, ASSIGNOR TO LOCKWOOD MANUFACTURING COMPANY, OF CINCINNATI, OHIO, A FIRM COMPOSED OF EDWIN F. LOCKWOOD AND HARRY A. LOCKWOOD.

MULTIPLE-PAN CONSTRUCTION.

1,149,927.      Specification of Letters Patent.      Patented Aug. 10, 1915.

Application filed August 14, 1914. Serial No. 856,869.

*To all whom it may concern:*

Be it known that I, EDWIN F. LOCKWOOD, a citizen of the United States, residing at Bellevue, in the county of Campbell and State of Kentucky, have invented certain new and useful Improvements in Multiple-Pan Construction, of which the following is a specification.

My invention relates to the construction of pans or like receptacles where a plurality of them are attached together, and it is especially applicable to baking pans for use in bakeries where the pans of a set must be securely joined together and prevented from being distorted through the action of the heat or by mechanical impact upon them, but wherein the pans must be spaced apart so that a free circulation of the heated air up between them will be permitted.

The object of my invention is to provide such pans, simply constructed, and without the use of rivets or other projections inside the pans, so as not to be unsanitary and not to affect the shape and appearance of the loaves of bread or other articles baked in pans.

My invention consists in the parts and in the details of construction and arrangement of parts as will be hereinafter more fully described and claimed.

In the drawing: Figure 1 is a plan view of a set of pans constructed according to my invention; Fig. 2 is an end elevation of the same; Fig. 3 is a detail of one of the middle pans of the set before it is completely formed; Fig. 4 is a detail of the wire of one of the end pans of the set; and Fig. 5 illustrates the wires of one of the middle pans arranged with relation to each other as they are to be in the rim of the pan.

The set of pans here shown consists of the end pans 1 and two middle pans 2, although it will be understood that any reasonable number of middle pans may be included in the set.

The end pan 1 comprises the body 3 and the wire 4 extending around in its rim; and each of the middle pans 2 similarly comprises the body 5 with wires 6 and 7 in its rim. Each of the bodies 3 or 5 of the end or middle pans preferably consists of one piece of sheet metal, usually tin plate, formed up so as to have a rectangular bottom and upwardly flaring sides and ends, the superfluous parts of the sheet at the corners being disposed of in folds 8 or 9, as the case may be, and the rims having side flanges 10 and end flanges 11 on the end pans, and side flanges 12 and end flanges 13 on the middle pans, which are first formed substantially horizontal and afterward bent down around the wires 4 on the end pans, or the wires 6 and 7 on the middle pans, in a manner somewhat similar to the usual wiring of the rims of sheet metal vessels.

The bodies 3 and 5 of the end and middle pans are alike except that only the inside rim flange 11 of each end pan is provided with two slits 14 near the middle, whereas both of the side rim flanges 12 of the middle pans have slits 15 near the middle. These slits 14 or 15, as the case may be, are cut transversely in the flanges while the flanges extend substantially horizontally prior to forming the flanges down over the wires, as is shown in Fig. 3.

The wire 4 of the end pan 1 has one complete side 16 and complete ends 17 at right angles thereto, but to extend on the other side of the pan parallel to the side 16 there is a short part 18 and a longer part 19 extending toward each other from the ends 17; the longer part 19 having an outward offset 20 some distance back from its end, leaving an outwardly spaced terminal portion 21. The parts 18 and 19 are adapted to come substantially in alinement, and the part 18 is discontinued short of the end of the terminal portion 21 of the part 19. When this wire 4 is in place in the rim of the pan 1, its offset 20 will extend out through one of the slits 14 and there will be a space in the rim from this offset 20 over to the end of the short part 18.

The two wires 6 and 7 of the middle pan 2 are alike in formation, but are inversely presented, as clearly shown in Fig. 5. Each wire consists of a complete end part 22 or 23, a short side 24 or 25 and a long side 26 or 27. Each short side 24 or 25 is like the short part of the side 18 of the wire 4 of the end pan, and each long part 26 or 27 is like the part 19 of said wire 4, comprising as it does, an outward offset 28, an outwardly spaced terminal portion 29 in the wire 6 and an outward offset 30 and outwardly spaced terminal portion 31 in the wire 7. The various parts 24, 25, 26 and 27 are of such length that when the wires 6 and 7 are in place in the rim of the pan 2 they will terminate short of each other at their respective sides of the pan, and their offsets 28 and 30 will extend out through respective slits 15 in the rim of the pan. Thus a space will be left in the rim between the parts 24 and 27 at one side and the parts 25 and 26 at the other side. On the side adjacent to the end pan 1 this space will receive the outwardly spaced part 21 of the wire of that pan, the offset 20 thereof entering through one of the slits 15 while the outwardly spaced part 31 will occupy the aforesaid space between the parts 18 and 19 in the rim of the pan 1, the offset 30 entering through the other slit 14 in said rim. At the other side of the middle pan 2 the space between the parts 25 and 26 will receive the outwardly spaced part 31 of the next middle pan 2, the offset 30 extending through the slit 15, while the outwardly spaced part 29 will occupy the space between the parts 24 and 27 in said next middle pan, with the offset 28 extending through the slit 15 in the rim of said next pan.

It will be seen that such assemblage may be duplicated to any reasonable extent, and when the rims are fully formed by bending the flanges down around the wires, each two adjacent pans will be firmly connected by the offsets of the wires, two of these extending parallel from one pan to the other near the middle of the side of each pan. Thus, at the same time the pans are wired they are firmly joined and spaced apart in the middle regions of their side rims, and it is to firmly join and space these parts of the pans that I provide the wiring as above described.

To form the main support for holding all of the pans of the set together I prefer to provide side rails 32, best seen in Fig. 2, having slots 33 with tongues 34, said tongues entering under the folds 8 and 9 at the ends of the pans when the pans are completely formed. At the ends of the set, these rails 32 also support shock absorbers 35 that protect the sides of the end pans against distortion from mechanical impact, but which, not forming part of this invention, need not be more particularly described.

The attachment of the supporting side rails 32 by means of the tongues 34 eliminates riveting from the ends of the pans, and my improved construction in the rims for joining and spacing the middle parts of the sides of the pans, eliminates riveting at the sides of the pans. Rivets are highly objectionable in baking pans, not only because they render the insides of the pans less smooth and therefore result in producing bakery goods of less presentable appearance, but because they render the insides of the pans difficult to keep clean, especially after the pans have been used for some time and the rivets have inevitably become somewhat loose under the action of the heat and the mechanical impact.

While thus confining the joining and spacing means to the rims of the pans, the wires running between the pans are amply strong to resist not only tension but compression, and thus prevent either inward or outward warping of the sides of the pans. If the sides warp either inwardly or outwardly, the pans produce a distorted baked article, and furthermore, if they are warped outward, the sides of the adjacent pans will come very close together and close the space therebetween against the free circulation of the heated air up between the pans, as is necessary to secure the best results in baking. While thus being amply strong for the purpose, the wires are of little bulk, and thus themselves form very little obstruction to this circulation of air.

Having fully described my invention, what I claim as new and desire to secure by Letters Patent is:

1. In multiple pan construction, a plurality of pans having rectangular rims, and a wire extending from the rims of one pan to the rim of the other pan, said wire extending entirely around the rim of one of the pans except in a space near the middle of one side thereof, and at one end of said space having an offset extending over to the other pan as aforesaid, and a terminal portion extending from the offset along the rim of the other pan.

2. In multiple pan construction, a plurality of pans having rims, a wire extending from the rim of one pan to the rim of the other pan, and a wire in the rim of the other pan extending over to the rim of the first mentioned pan.

3. In multiple pan construction, a plurality of pans having rims, a wire extending from the rim of one pan to the rim of the other pan, the material of each rim having an opening, said wire extending through the openings, and a wire in the rim of the other pan extending over into the rim of the first mentioned pan.

4. In multiple pan construction, a plurality of pans having rims, a wire extending from the rim of one pan to the rim of the other pan, said wire extending along the rim of one pan, and comprising an offset extending over to the rim of the other pan, a terminal part extending from the offset along the rim of the other pan, and a wire in the rim of the other pan extending over into the rim of the first mentioned pan.

5. In multiple pan construction, a plurality of pans having rectangular rims, and a wire extending from the rim of one pan to the rim of the other pan, said wire extending entirely around the rim of one of the pans except in a space near the middle of one side thereof, and at one end of said space having an offset extending over to the other pan as aforesaid, a terminal portion extending from the offset along the rim of the other pan, and a wire in the rim of the other pan extending over into the rim of the first mentioned pan.

6. In multiple pan construction, a plurality of pans having rectangular rims, a wire in the rim of one of the pans extending entirely therearound except in a space at one side thereof, said wire comprising an offset extending out from the rim at one end of said space, and a terminal portion extending from the offset and spaced out from the side of the rim, a pair of wires in the rim of the other pan collectively extending entirely around the rim of this other pan except in spaces at opposite sides of the pan, each of these wires comprising an offset extending out of the rim at the respective side of the pan and at opposite ends of the respective spaces, and terminal portions extending from the respective offsets and spaced out from the respective sides of the pans, each terminal portion of a pan lying within the space in the rim at the adjacent side of another pan in the plurality of pans, whereby the pans are joined and spaced apart by the offsets of the wires.

7. In multiple pan construction, a plurality of pans each having a rectangular rim and comprising end pans and middle pans, a wire in the rim of each end pan extending completely along one side and both ends of the rim thereof and having a long part and a short part extending toward each other along the other side of the rim, said long part comprising an offset extending out through the rim, and a terminal portion extending from the offset substantially parallel with but outwardly spaced from the rim, said short part of the wire in this side of the rim terminating short of the long part and leaving a space in the rim between it and the offset of the long part, and a wire in the rim of each middle pan comprising a part extending along each end thereof, and a part extending along the side adjacent to the respective end pan comprising an offset and an outwardly spaced terminal portion, and leaving a space in the rim adjacent to the offset, this terminal portion lying within the space in the rim of the adjacent end pan, and the outwardly spaced terminal portion of the wire in the adjacent end pan lying within this space in this middle pan, whereby the adjacent sides of the pans are joined and spaced by the offset parts of the wires extending from each pan to the other.

8. In multiple pan construction, a plurality of pans each having a rectangular rim and comprising end pans and middle pans, a wire in the rim of each end pan extending completely along one side and both ends of the rim thereof and having a long part and a short part extending toward each other along the other side of the rim, said long part comprising an offset extending out through the rim, and a terminal portion extending from the offset substantially parallel with but outwardly spaced from the rim, said short part of the wire in this side of the rim terminating short of the long part and leaving a space in the rim between it and the offset of the long part, and a wire in the rim of each middle pan comprising a part extending along each end thereof, and a part extending along the side adjacent to the respective end pan comprising an offset and an outwardly spaced terminal portion, and leaving a space in the rim adjacent to the offset, this terminal portion lying within the space in the rim of the adjacent end pan, the outwardly spaced terminal portion of the wire in the adjacent end pan lying within this space in this middle pan, whereby the adjacent sides of the pans are joined and spaced by the offset parts of the wires extending from each pan to the other, each middle pan having at its other side a short part joining the part of the wire that extends along the end, and another wire in the rim of each middle pan comprising a part that extends along the other end of the pan and a short part extending from the part in the end along the side adjacent to the respective end pan, but terminating close to the offset of the wire of said end pan where it lies in the space in the rim of said middle pan, and this other wire in said middle pan comprising a part at its other side extending from the part in the end along the other side and having an offset extending out from the rim at that other side, and a terminal portion extending from the offset and outwardly spaced from that other side, there being a space left between the offset and the part of the first mentioned wire in this other side of this middle pan, receiving the offset part of the wire in the adjacent side of the other middle pan.

EDWIN F. LOCKWOOD.

Witnesses:
JAMES N. RAMSEY,
CLARENCE PERDEW.

Copies of this patent may be obtained for five cents each, by addressing the "Commissioner of Patents, Washington, D. C."